US010325428B1

(12) United States Patent
Kurian et al.

(10) Patent No.: US 10,325,428 B1
(45) Date of Patent: Jun. 18, 2019

(54) ACCESS CONTROL USING DEVICE LOCATION TRACKING AND BLOCKCHAINS

(71) Applicant: BANK OF AMERICA CORPORATION, Charlotte, NC (US)

(72) Inventors: Manu J. Kurian, Dallas, TX (US); Joseph B. Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/987,349

(22) Filed: May 23, 2018

(51) Int. Cl.
*H04L 29/06* (2006.01)
*G07C 9/00* (2006.01)

(52) U.S. Cl.
CPC ..... *G07C 9/00103* (2013.01); *G07C 9/00309* (2013.01); *G07C 2009/0019* (2013.01)

(58) Field of Classification Search
None
See application file for complete search history.

(56) References Cited

U.S. PATENT DOCUMENTS

| | | | |
|---|---|---|---|
| 6,674,367 B2 | 1/2004 | Sweatte | |
| 7,802,724 B1 | 9/2010 | Nohr | |
| 9,311,656 B2 | 4/2016 | Barnes, Jr. | |
| 9,426,118 B2 * | 8/2016 | Kim | H04W 76/10 |

OTHER PUBLICATIONS

Lombardo, H., "Using Blockchains for IoT in Facilities Management," Aug. 8, 2016, 4 pages.

* cited by examiner

*Primary Examiner* — K. Wong
(74) *Attorney, Agent, or Firm* — Michael A. Springs

(57) ABSTRACT

An access control system that includes Internet of Things sensors and a controller within a controlled area. The controller is configured to detect a guest device for a guest, to link a guest block chain account with the guest, to identify a sponsor associated with the guest, and to identify a sponsor block chain account for the sponsor. The controller is further configured to publish an access control contract to the block chain. The access control contract includes executable instructions for publishing a transaction in the block chain transferring a validation token from the sponsor block chain account to the guest block chain account and conditions linked with the executable instructions. The controller is configured to determine whether the conditions have been satisfied and to send a trigger message that triggers the access control contract to execute the instructions in response to determining the conditions have been satisfied.

20 Claims, 6 Drawing Sheets

ACCESS CONTROL USING DEVICE LOCATION TRACKING AND BLOCKCHAINS

TECHNICAL FIELD

The present disclosure relates generally to information security, and more specifically to access control and resource sharing.

BACKGROUND

Conventional systems use an all or nothing approach to provide access control for controlling access to resources and controlled areas. For example, when a person requests access to a controlled or restricted access area, conventional systems typically only have the ability to either allowing complete access to the controlled area or to deny access to the controlled area. Once a person has been granted access to the controlled area, the system is unable to revoke the person's access. Conventional systems lack the functionality to control a person's access privileges once they have been granted.

Another limitation of conventional systems is their inability to control the usage of resources that are shared among users. For example, when a user grants access for another user to use their resources, conventional systems are unable to control how the resources are used once another user has been granted permission to use them. These systems lack to the ability control when and how another user uses resources and the ability to revoke these privileges once they have been granted to another user.

The inability to control access privileges and the usage of shared resource once access has been granted is a technical problem that is inherent to conventional systems because of their all or nothing approach to access control. These limitations limit these system's ability to provide adequate information security and access control since the system loses the ability to control access once access has been granted.

SUMMARY

The inability to control access privileges and the usage of shared resource once access has been granted is a technical problem that is inherent to conventional systems because of their all or nothing approach to access control. For example, when a person requests access to a controlled or restricted access area, conventional systems typically only have the ability to either allowing complete access to the controlled area or to deny access to the controlled area. Once the person has been granted access to the controlled area, the system is unable to revoke the persons access. Conventional systems lack the functionality to control a person's access privileges once they have been granted.

In contrast to conventional systems, the access control system described in the present application employs an access control contract that is published in a block chain to provide dynamic access control. The access control system can monitor a user's behavior within a controlled area to determine whether to grant or to continue granting access for the user to the controlled area. The access control system can revoke the user's access in real-time in response to determining that the user is not complying with the condition specified by the access control contract. This feature allows the access control system to remove access privileges at any time even after the user has been granted access to the controlled area. This is in contrast to conventional systems that employ an all or nothing approach to access control where the system is unable to revoke access privileges once they have been granted to the user. Here, the access control system provides increased security and control of the access that is being provided to users within the controlled area.

In some instances, the conditions of the access control contract can be dynamically adjusted based on the user's behavior. For example, the access control system may dynamically adjust the conditions of the access control contract based on the location of the user within the controlled area. For instance, the access control system may impose stricter conditions when the user is within a restricted access area. The access control system may also dynamically relax the access control contract conditions when the user is no longer within the restricted access area. Unlike conventional systems, this feature allows the access control system to provide flexible access control. This improves the performance of the access control system by allowing the access control system to dynamically adjust access control for a user in real-time.

Conventional systems are unable to control the usage of resources that are shared among users once permission has been granted. These systems lack the ability control when and how another user uses resources and the ability to revoke these privileges once they have been granted to another user. In contrast to these systems, the access control system uses the access control contract to dynamically control how shared resources are used. The access control contract specifies conditions that have to be satisfied before a user has access to another user's resources. Here, the access control system is able to control how a user uses shared resources by enforcing the access control contract conditions. The specified conditions allow another user to use a shared resource, but limits and controls how the user uses the shared resource. This improves the operation of the access control system by allowing the access control system to specify and controlled how shared resources are used even after a user has been granted permission to use the resources.

Another technical advantage of the access control system is the usage of a block chain for implementing the access control contract which provides information security and the ability to audit and verify the access privileges that are granted to the user. The block chain is implemented using a distributed ledger that makes modifying the data within the block chain difficult for a bad actor. Conventional systems typically store data in a centralized database. These systems are vulnerable to attack because once the database becomes compromised a bad actor is able to modify and extract the data stored in the database. This means that a bad actor only needs to compromise a single database to compromise the entire system. In contrast to these systems, a block chain is implemented using a distributed ledger that is shared among multiple devices that form a distributed network. Instead of having to breach one device (i.e. the centralized database), modifying information in the block chain can only be achieved if a majority of the devices of the distributed network are compromised. Being able to compromise enough devices to falsify records on the block chain is extremely difficult, especially because a bad actor would need to breach each of the devices simultaneously. Using a block chain to implement the access control contract provides increased information security for the access control system. In addition, the information in the block chain is accessible to any device with a copy of the block chain ledger, which allows the data in the block chain to be verified at any time. This means that the access control system is able to record the access privileges that have been granted to a user at any time. This information can be verified at any time (e.g. in real-time) to ensure that a user within the controlled area has permission to be within the controlled area.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
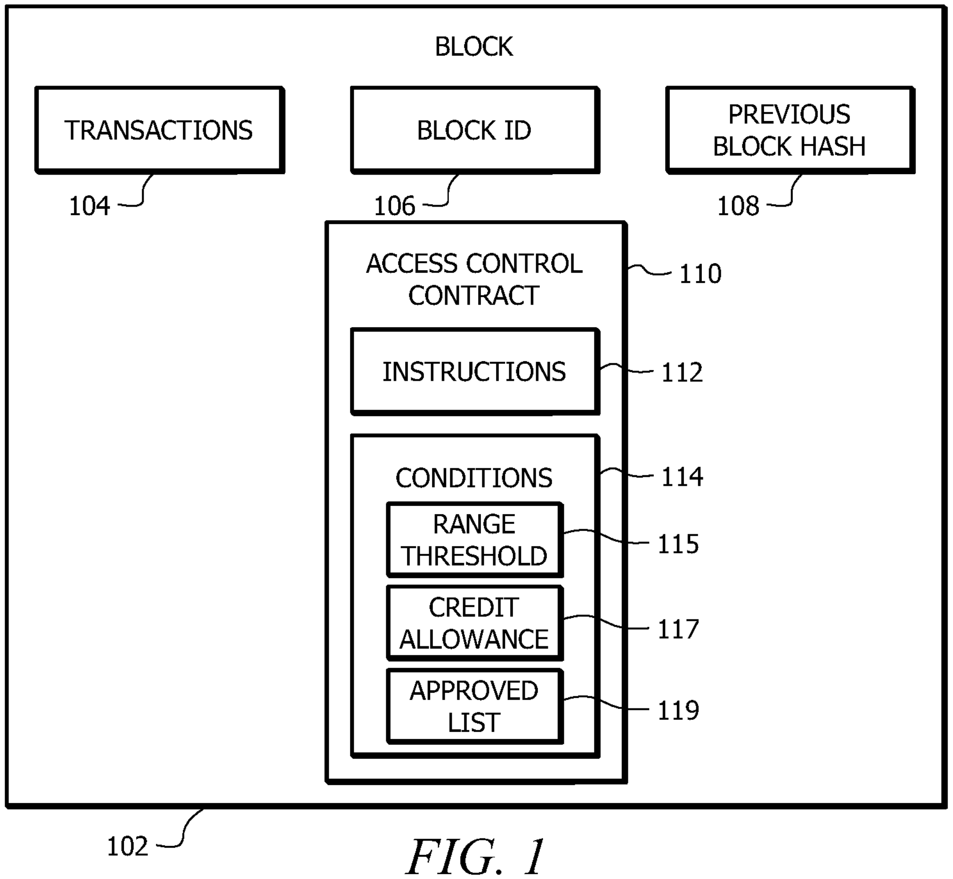
FIG. 1 illustrates an embodiment of a block from a block chain.

Disclosed herein are various embodiments of an access control system and methods that provide dynamic access control for users. The access control system employs an access control contract that is stored within a block chain to manage and track access to resources, products, services, information, and/or controlled areas for a user. The access control contract specifies predetermined conditions that have to be satisfied before a user is granted access to any resources.

Using access control contracts allows the access control system to provide dynamic access control. For example, the access control system may monitor a user's behavior within a controlled area to determine whether to grant or to continue to granting access for the user to the controlled area. The access control system can revoke the user's access in real-time in response to determining that the user is not complying with the condition specified by the access control contract. This feature allows the access control system to remove access privileges at any time even after the user has been granted access to the controlled area. This is in contrast to conventional systems that employ an all or nothing approach to access control where the system is unable to revoke access privileges once they have been granted to the user. Here, the access control system provides increased security and control of the access that is being provided to users within the controlled area.

In some instances, the conditions of the access control contract can be dynamically adjusted based on the user's behavior. For example, the access control system may dynamically adjust the conditions of the access control contract based on the location of the user within the controlled area. For instance, the access control system may impose stricter conditions when the user is within a restricted access area. The access control system may also dynamically relax the access control contract conditions when the user is no longer within the restricted access area. Unlike conventional systems, that employ an all or nothing approach to access control, this feature allows the access control system to provide flexible access control. This improves the performance of the access control system by allowing the access control system to dynamically adjust access control for a user in real-time.

Using the access control contract also allows the access control system to dynamically share resources between users. For example, the access control contract may specify conditions that have to be satisfied before a user has access to another user's resources. This is again in contrast to conventional systems that employ an all or nothing approaching for granting access to resources. In these conventional systems, the system is unable to control how resources are used once a user has authorized another user to use the resource. Here, the access control system is able to control how a user uses shared resources by enforcing the access control contract conditions. The specified conditions allow another user to use a shared resource, but limits and controls how the user uses the shared resource. This improves the operation of the access control system by allowing the access control system to specify and control how shared resources are used even after a user has been granted permission to use the resources.

Using a block chain provides information security and the ability to audit and verify the access privileges that are granted to the user. The block chain is implemented using a distributed ledger that makes modifying the data within the block chain difficult for a bad actor. In addition, the information in the block chain is accessible to any device with a copy of the block chain ledger, which allows the data in the block chain to be verified at any time. This means that the access control system is able to record the access privileges that have been granted to a user at any time. This information can be verified at any time (e.g. in real-time) to ensure that a user within the controlled area has permission to be within the controlled area.

Figure 2:
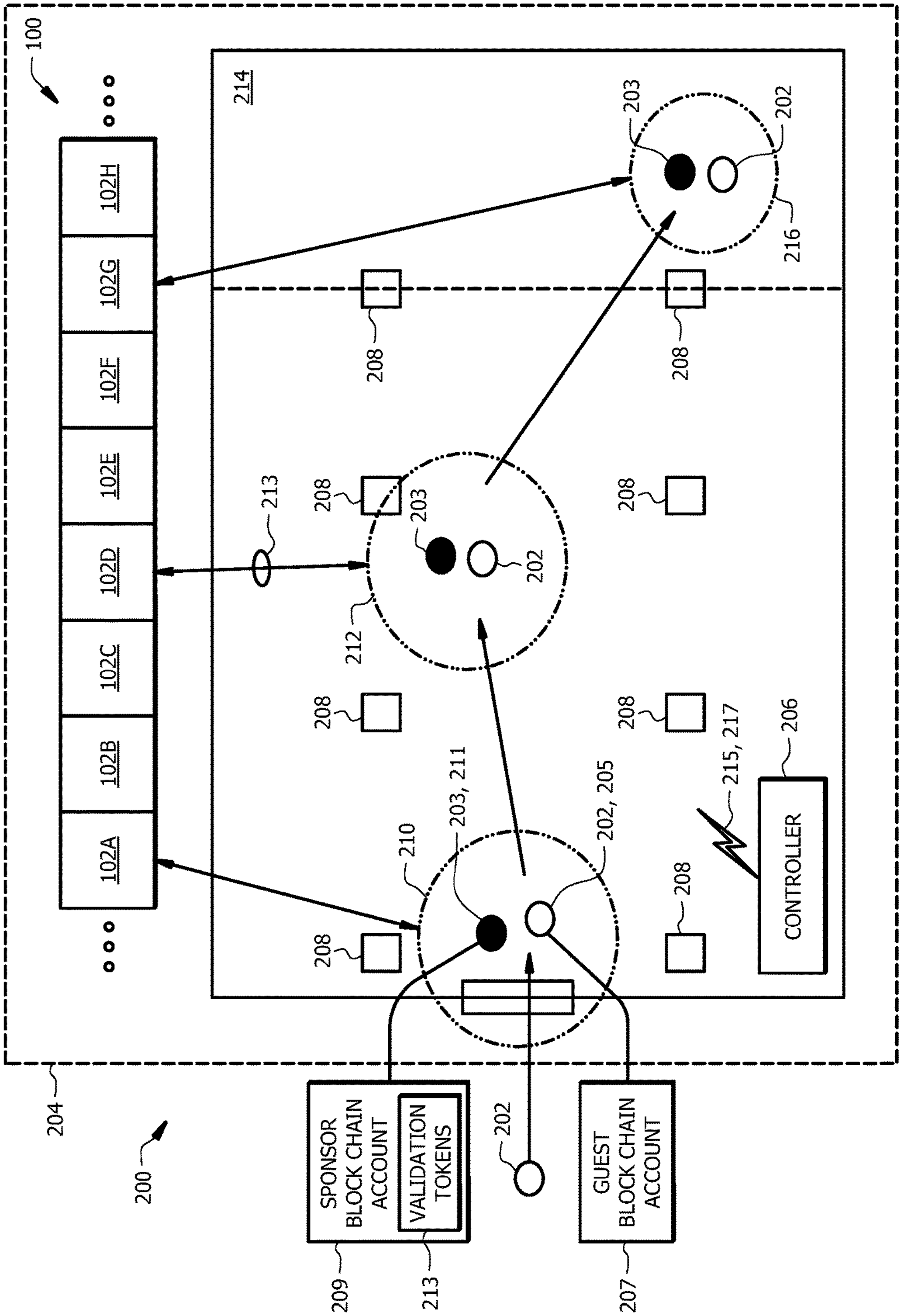
FIG. 2 is a schematic diagram of an embodiment of an access control system.
Figure 4:
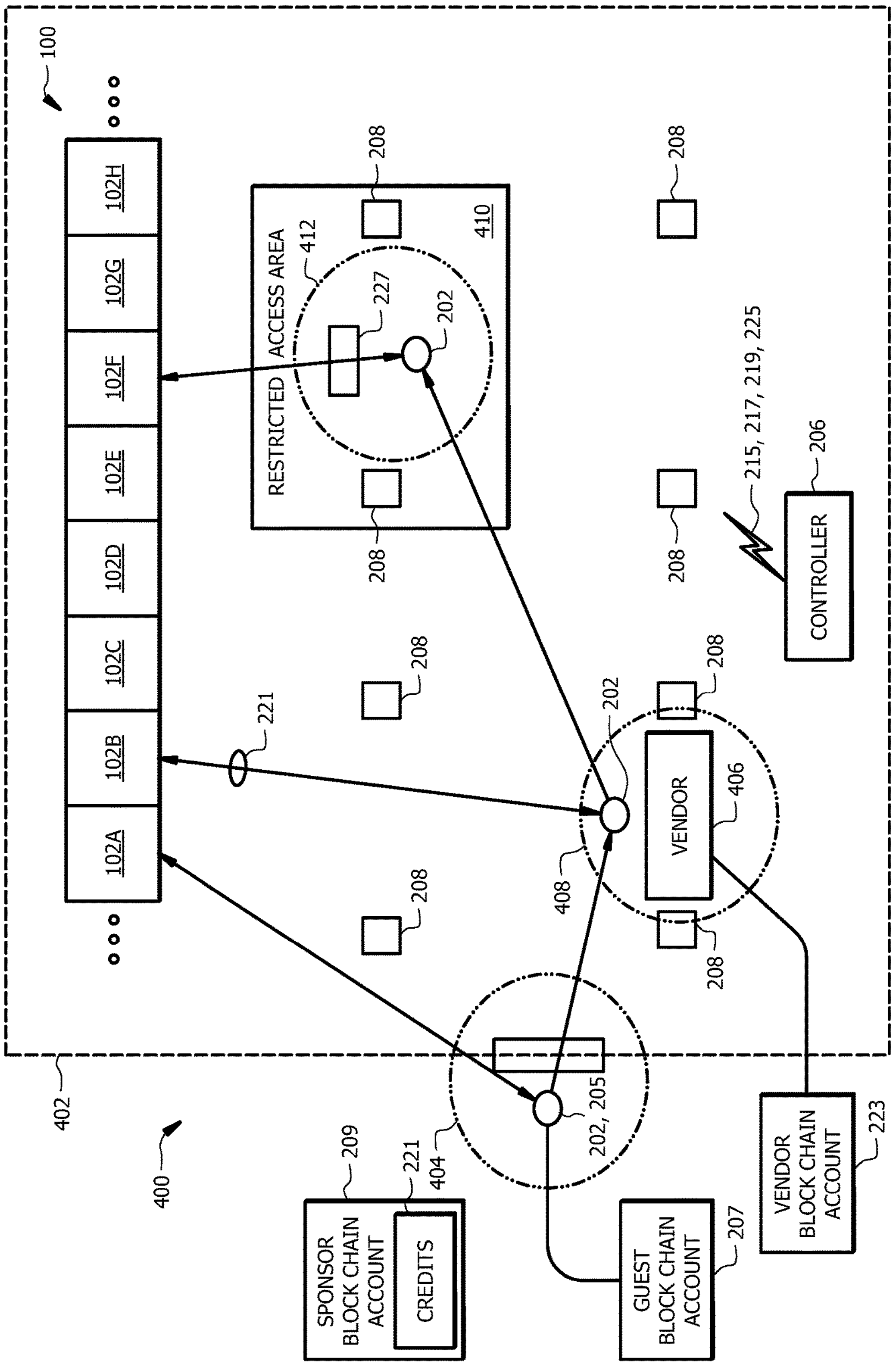
FIG. 4 is a schematic diagram of an embodiment of an access control system employing resource sharing.

FIG. 1 illustrates an embodiment of a block 102 from a block chain. A block chain generally refers to a database shared by a plurality of devices or network nodes in a network. An access control system may employ any suitable number of devices (e.g. controllers) to form a distributed network that maintains a block chain. Examples of a block chain and blocks are shown in FIGS. 2 and 4. Each network node comprises a ledger configured to store a copy of the block chain, which contains every block chain transaction executed in the network. The block chain links together blocks 102 of data which comprise identifiable units called transactions 104. Transactions 104 may comprise information, files, or any other suitable type of data. For example, a transaction 104 may comprise information associated with access control contracts, financial transactions, medical history, personal information, or any other type of information. As another example, a transaction 104 may comprise files or documents being shared between users.

Each block 102 in the block chain comprises a block identifier 106 and information derived from a preceding block 102. For example, every block 102 in the block chain includes a hash 108 of the previous block 102. By including the hash 108, the block chain comprises a chain of blocks 102 from a genesis block 102 to the current block 102. Each block 102 is guaranteed to come after the previous block 102 chronologically because the previous block's hash 108 would otherwise not be known. In one embodiment, blocks 102 in a block chain may be linked together by identifying a preceding block with a cryptographic checksum (e.g. secure hash algorithm (SHA)-256) of its contents (e.g. the transaction and additional metadata) which serves as each block's unique identifier. Links are formed by storing the cryptographic checksum identifier of one block 102 in the metadata of another block 102, such that the former block 102 becomes the predecessor of the latter block 102. In this way, the blocks 102 form a chain that can be navigated from block-to-block by retrieving the cryptographic checksum of a particular block's predecessor from the particular block's own metadata. Each block 102 is computationally impractical to modify once it has been in the block chain because every block 102 after it would also have to be regenerated. These features protect data stored in the block chain from being modified by bad actors which provides information security. When a network node publishes an entry (e.g. one or more transactions 104 in a block 102) in its ledger, the block chain for all other network nodes in the distributed network is also updated with the new entry. Thus, data published in a block chain is available and accessible to every network node with a ledger. This allows the data stored in the block to be accessible for inspection and verification at any time by any device with a copy of the ledger.

Some blocks 102 comprise one or more access control contracts 110. The access control contracts 110 comprise computer executable code, script, or instructions 112 that are configured to execute when a set of predetermined conditions 114 have been satisfied. The access control contract 110 is configured to receive messages or information from other devices (e.g. a controller) and to use the conditions 114 as logical tests to determine whether or not to execute a set of instructions 112. An access control contract 110, instructions 112, and conditions 114 may be written C++, C#, Go, Python, Java, extensible markup language (XML) script, or any other suitable programming language.

The instructions 112 may be configured with instructions for performing any specified operations. For example, the instructions 112 may be configured to facilitate a transfer between block chain accounts. In one embodiment, the instructions 112 comprise instructions for publishing a transaction in a block chain for transferring a validation token 213 from a sponsor block chain account 209 to a guest block chain account 207. An example of using these instructions is described in FIGS. 2 and 3. In another embodiment, the instructions 112 comprise instructions for publishing a transaction in a block chain for transferring credits 221 from a sponsor block chain account 209 to a vendor block chain account 223. An example of these instructions is described in FIGS. 4 and 5. In other embodiments, the instructions 112 may comprise any other suitable type and combination of executable instructions for performing other types of operations.

The conditions 114 may be configured as Boolean tests for determining whether a condition 114 has been satisfied. Examples of conditions 114 include, but are not limited to, range threshold values 115, credit allowances 117, valid time periods, approved product and service types, approved locations or areas, or any other suitable type of condition 114. For example, a condition 114 may be a range threshold value 115. The access control contract 110 may compare a received range value to the range threshold value 115 to determine whether the condition 114 has been satisfied. In some embodiments, the conditions 114 may be adjusted to provide dynamic access control based on a user's behavior. Examples of using conditions 114 are described in FIGS. 2-5.

Figure 3:
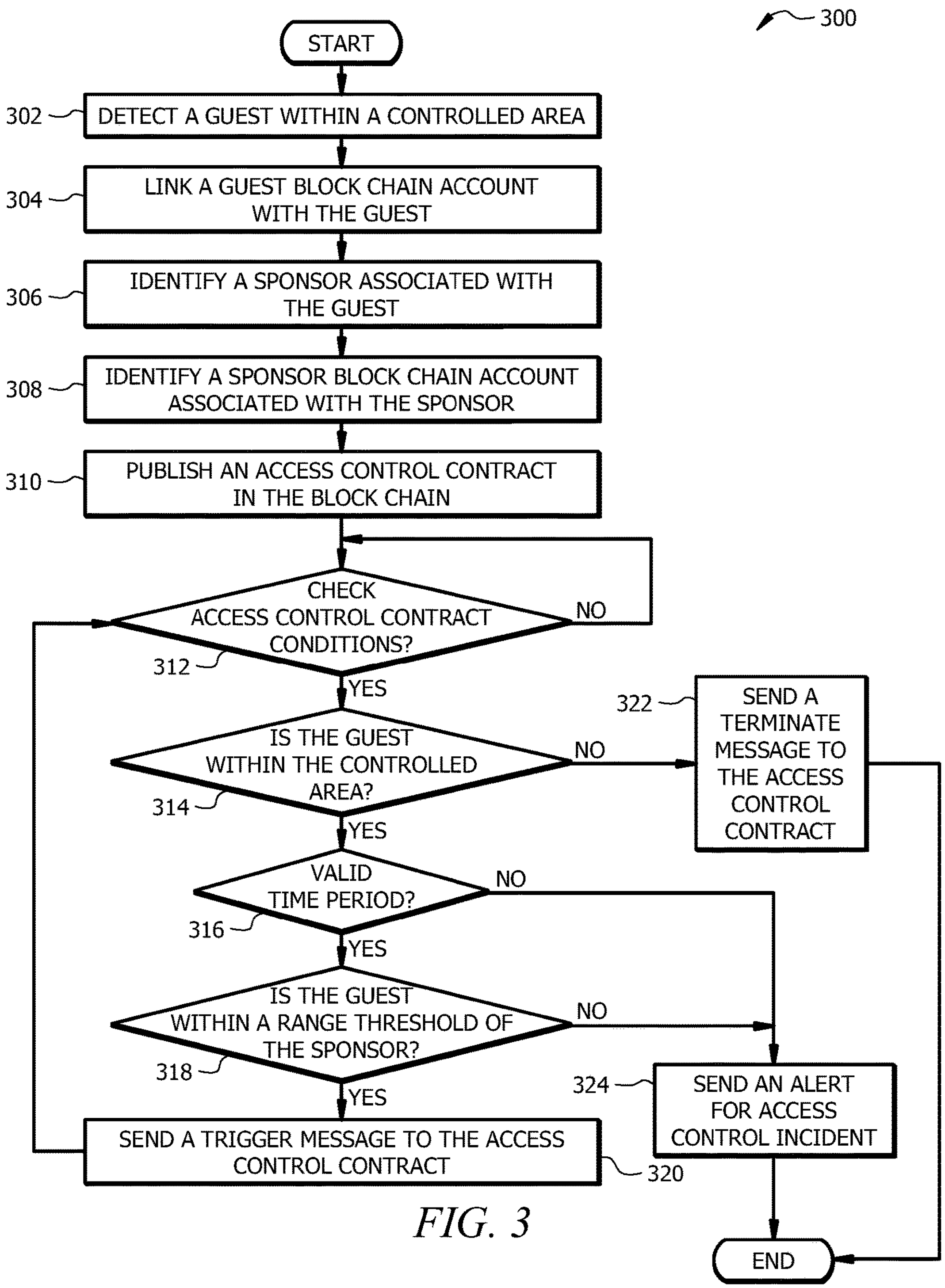
FIG. 3 is a flowchart of an embodiment of an access control method for the access control system.

FIGS. 2 and 3 combine to provide a non-limiting example of an environment and application where an access control system may be implemented. In this example, a guest is visiting someone in a controlled area. For instance, the guest may be someone visiting a client at their office for a meeting. The access control system is configured to monitor the location of the guest within the controlled area in real-time while providing access to rooms, information, and/or resources within the controlled area. The access control system uses an access control contract 110 in a block chain 100 to dynamically allow or deny access to resources within the controlled area. This allows the access control system to continuously monitor the guest's behavior to determine whether access should continue to be granted to the guest. The access control system can revoke the guest's access privileges in response to determining that the guest is not complying with the conditions specified by the access control contract.

FIG. 2 is a schematic diagram of an embodiment of an access control system 200 for a controlled area 204. Examples of controlled areas 204 include, but are not limited to, an office, a building, a complex, a work space, a piece of land, a shopping center, a bank, an amusement park, a concert venue, or any other suitable type of building or area. The controlled area 204 may be defined by physical and/or virtual boundaries. For example, the controlled area 204 may be bounded by physical features such as walls or fences. In other examples, the controlled area 204 may not have any physical boundaries such as an open fair ground.

The controlled area 204 comprises a controller 206 in signal communication with a plurality of Internet of Things (IoT) sensors or devices 208. The IoT sensors 208 and the controller 206 may be in signal communication with each other using any suitable type of wired or wireless communications. The IoT sensors 208 are configured to determine the location of people (e.g. a guest 202 and a sponsor 203) or things within the controlled area 204 based on their user devices (e.g. devices 205 and 211). Examples of user devices include, but are not limited to, mobile phones, tablets, smart watches, and laptops. In this example, an IoT sensor 208 may determine the location of a person (or thing) based on the signal strength between the person's user device and the IoT sensor 208. In one embodiment, the IoT sensors 208 are configured to use near-field communications (NFC) to determine the signal strength between a device (e.g. a guest device 205) and an IoT sensor 208. In other examples, the IoT sensors 208 may be configured to detect and determine the location of devices using Bluetooth, Li-Fi, Wi-Fi, Radio-frequency Identification (RFID), Z-wave, Zigbee, or any other suitable communication protocol. In one embodiment, the IoT sensors 208 may be configured to determine the location of a person based on a device issued to the person upon entering the controlled area 204. For example, the guest 202 may receive a badge or key card with a passive or active tag that can be detected by the IoT sensors 208 to determine the location of the guest 202.

In one embodiment, the IoT sensors 208 are configured to form a mesh network that allows the IoT sensors 208 to communicate with each other. The IoT sensors 208 may communicate with each other using any suitable communication protocol.

The controller 206 facilitates access control by monitoring the location of the guest 202 using the IoT sensors 208. The IoT sensors 208 send information about the guest 202 to the controller 206. Based on the received information about the guest 202, the controller 206 determines whether the conditions 114 of an access control contract 110 in a block chain 100 have been satisfied. Based on the determination, the controller 206 communicates with the access control contract 110 to provide real-time access control within the controlled area 204. Access control may include access to areas, information, and/or resources within the controlled area 204. Additional information about the controller 206 is described in FIG. 6. Examples of the controller 206 in operation is described in FIGS. 3 and 5.

FIG. 3 is a flowchart of an embodiment of an access control method 300 for the access control system 200. Continuing with the previous example, the guest 202 may be someone visiting a sponsor 203 (e.g. a client) for a meeting in their offices. The access control method 300 may be implemented by the controller 206 to monitor the location of the guest 202 within the controlled area 204 while providing real-time access to rooms, information, and/or resources within the controlled area 204.

At step 302, the controller 206 detects the guest 202 within a controlled area 204. Referring to FIG. 2, at location 210, the guest 202 enters the controlled area 204 to meet with a sponsor 203. The controller 206 may receive device information from one or more IoT sensors 208 that identifies the presence of the guest 202. The device information may be for the guest's user device 205 or for a device issued to the guest 202 upon entering the controlled area 204.

At step 304, the controller 206 links a guest block chain account 207 with the guest 202. The guest block chain account 207 is an account that can be used for making transactions with other block chain accounts on a block chain 100. The guest block chain account 207 may be temporarily or permanently linked with the guest 202. For example, the controller 206 may reuse guest block chain accounts 207 by temporarily assigning a block chain account to a guest 202 during their visit and recycling the block chain account when the guest 202 leaves.

At step 306, the controller 206 identifies the sponsor 203 associated with the guest 202. In one embodiment, the controller 206 checks a registry to identify the sponsor 203 linked with the guest 202. For example, the controller 206 may check a registry that lists the schedule visitors and meetings for the day. The controller 206 may identify the sponsor 203 based on device information for a user device 211 linked with the sponsor 203. The controller 206 may receive the device information for the sponsor's user device 211 from an IoT sensor 208.

At step 308, the controller 206 identifies a sponsor block chain account 209 associated with the sponsor 203. The sponsor block chain account 209 is a block chain account that is linked with the sponsor 206 and that can be used for making transactions with other block chain accounts (e.g. guest block chain accounts 207) on the block chain 100. The sponsor block chain account 209 may be configured with any suitable amount of validation tokens 213. Validation tokens 213 are a pseudo-currency that can be used to indicate when a guest 202 is authorized to access the controlled area 204. Validations tokens can be checked by other devices and/or personnel to determine whether a guest 202 is authorized to access the controlled area 204. In one embodiment, a validation token 213 is invalid or expires after a predetermined amount of time. When a guest 202 does not have any valid validation tokens 213 in their guest block chain account 207, then the guest 202 loses authorization to access the controlled area 204.

At step 310, the controller 206 publishes an access control contract 110 in the block chain 100. Referring to FIG. 2, the controller 206 may publish the access control contract 110 to block 102A in the block chain 100. The access control contract 110 comprises instructions 112 for transferring validation tokens 213 from the sponsor block chain account 209 to the guest block chain account 207 and conditions 114 for when to execute the instructions 112.

In this example, the conditions 114 specify a range threshold value 115 which indicates a maximum allowable distance between the guest 202 and their sponsor 203. The range threshold value 115 may be set to any suitable distance. For example, the range threshold value 115 may be set to 10 feet or 20 feet. This condition 114 is used to ensure that the guests 202 remains within proximity of their sponsor 203. As long as the guest 202 is within the range threshold value 115 of their sponsor 203, the guest 202 will continue to receive validation tokens 213 indicating that they are authorized to access the controlled area 204. When the guest 202 wanders too far away from their sponsor 203, the guest 202 will no longer receive validation tokens 213 which indicates that the guest 202 is no longer authorized to access the controlled area 204. The conditions 114 may specify any type or combination of criteria that need to be satisfied before executing the instructions 112.

The controller 206 periodically checks whether the conditions 114 of the access control contract 110 are being satisfied. At step 312, the controller 206 determines whether to check the access control contact conditions 114. In one embodiment, the controller 206 checks whether the access control contact conditions 114 have been satisfied at predetermined time intervals. For example, the controller 206 may check the whether the access control contact conditions 114 have been satisfied every 30 second, every 5 minutes, every 10 minutes, or after any other suitable amount of time. In other examples, the controller 206 may check whether the access control contact conditions 114 have been satisfied after the guest 202 and/or the sponsor 203 move a predetermined amount of distance or when the guest 202 and/or the sponsor 203 move past or near an IoT sensor 208. The controller 206 may use any other criteria for determining when to check whether the access control contact conditions 114 have been satisfied. The controller 206 proceeds to step 314 in response to determining to check the access control contract conditions 114. Otherwise, the controller 206 remains at step 312.

Referring to FIG. 2 as an example, at location 212, the controller 206 checks whether the conditions 114 of the access control contract 110 are being satisfied. At step 314, the controller 206 determines whether the guest 202 is within the controlled area 204. The controller 206 may receive location information from one or more IoT sensors 208 that indicate that the guest 202 is still within the controlled area 204. The controller 206 proceeds to step 316 in response to determining that the guest 202 is within the controlled area 204. Otherwise, the controller 206 proceeds to step 322 in response to determining that the guest 202 is no longer within the controlled area 204.

At step 316, the controller 206 determines whether the current time is within a valid time period identified by the access control contract conditions 114. In this example, the access control contract conditions 114 may specify a time period or window when the guest 202 is allowed to access the controlled area 204. For instance, the guest 202 may only be provided with access to the controlled area 204 within a two hour time window for a meeting. The conditions 114 may specify any suitable time window or period. In some examples, the conditions 114 may not specify a valid time period. The controller 206 proceeds to step 318 in response to determining that the current time is within the time period identified by the access control contract 110. Otherwise, the controller 206 proceeds to step 324 in response to determining that the current time is not within the time period identified by the access control contract 110.

At step 318, the controller 206 determines whether the guest 202 is within a range threshold 115 of the sponsor 203. In one embodiment, the controller 206 receives the current guest location and the current sponsor location from one or more IoT sensors 208. The controller 206 then determines a location difference between the current guest location and the current sponsor location. For example, the location distance may indicate that the guest 202 and the sponsor 203 are within ten feet of each other. The controller 206 compares the computed location difference between the guest 202 and the sponsor 203 to the range threshold value 115 specified by the access control contract conditions 114. The controller 206 proceeds to step 320 in response to determining that the guest 202 is within the range threshold 115 of the sponsor 203. In this example, the controller 206 proceeds to step 320 when the access control contract conditions 114 have been satisfied. Otherwise, the controller 206 proceeds to step 324 in response to determining that the guest 202 is not within the range threshold 115 of the sponsor 203.

At step 320, the controller 206 sends a trigger message 215 to the access control contract 110 in response to determining that the conditions 114 have been satisfied. The trigger message 215 is a signal for the access control contract 110 that triggers the access control contract 110 to execute the instructions 112 for transferring a validation token 213 from the sponsor block chain account 209 to the guest block chain account 207. Referring to FIG. 2, the access control contract 110 may publish the transaction to block 102D in the block chain 100. The trigger message 215 may be any suitable type of message or signal as would be appreciated by one of ordinary skill in the art. Once the guest 202 receives the validation token 213 in their guest block chain account 207, the guest 202 is authorized to continue accessing the controlled area 204. After sending the trigger message 215 to access control contract 114, the controller 206 returns to step 312.

In contrast, when the guest 202 does not satisfy the access control contract conditions 114, the controller 206 proceeds to step 324 where the controller 206 sends an alert about the access control incident. The alert indicates that there has been an access control incident. For example, an alert may identify the guest 202 and/or the sponsor 203 associated with the access control incident. In one embodiment, the alert may also identify the type of access control incident. For instance, the alert may indicate that the guest 202 is within the controlled area 204 beyond the preapproved time period, that the guest 202 is outside of the range threshold 115 of their sponsor 203, the guests 202 is a restricted access area, or any other condition 114 that was not satisfied. The alert may be any suitable type of message or signal as would be appreciated by one of ordinary skill in the art. After sending the alert, the controller 206 may terminate method 300.

Returning to step 314, the controller 206 proceeds to step 322 in response to determining that the guest 202 is no longer within the controlled area 204. At step 322, the controller 206 sends a terminate message 217 to the access control contract 110 and terminates method 300. In one embodiment, the controller 206 is configured to only monitor the guests 202 while the guest 202 is within the controlled area 204. Once the guest 202 leaves the controlled area 204, the controller 206 can suspend tracking the guest 202 and determining whether the access control contract conditions 114 have been satisfied. This feature allows resources to be released from tracking and monitoring the guests 202 when the guest 202 is no longer within the controlled area 204. The trigger signal may be a signal for the access control contract 110 to self-destruct or to suspend checking for whether access control contrast conditions 114 are being satisfied. For example, the controller 206 may send the terminate message 217 to trigger termination instructions 112 stored in the access control contract 110. When the access control contract 110 executes the termination instructions 112, the access control contract 110 may suspend transferring validation tokens 213 from the sponsor block chain account 209 to the guest block chain account 207. The terminate message 217 may be any suitable type of message or signal as would be appreciated by one of ordinary skill in the art.

In one embodiment, the controller 206 is further configured to modify (e.g. reduce or increase) the range threshold value 115 specified in the access control contract 110 in response to the guest 202 entering a restricted access area within the controlled area 204. For example, referring to location 216 in FIG. 2, the controller 206 may reduce the range threshold value 115 (shown as a dashed perimeter) used by the access control contract 110 when the guest 202 enters the restricted access area 214. Reducing the range threshold value 115 means that the guest 202 needs to remain physically closer to their sponsor 203 while in the restricted access area 214 in order to satisfy the access control contract conditions 114. In one embodiment, the controller 206 is configured to increase the range threshold value 115 when the guest 202 exits the restricted access area 214.

In one embodiment, the controller 206 publishes the range threshold value 115 update to the block chain 100. Referring to FIG. 2, the controller 206 may publish the range threshold value 115 update to block 102G in the block chain 100.

Figure 5:
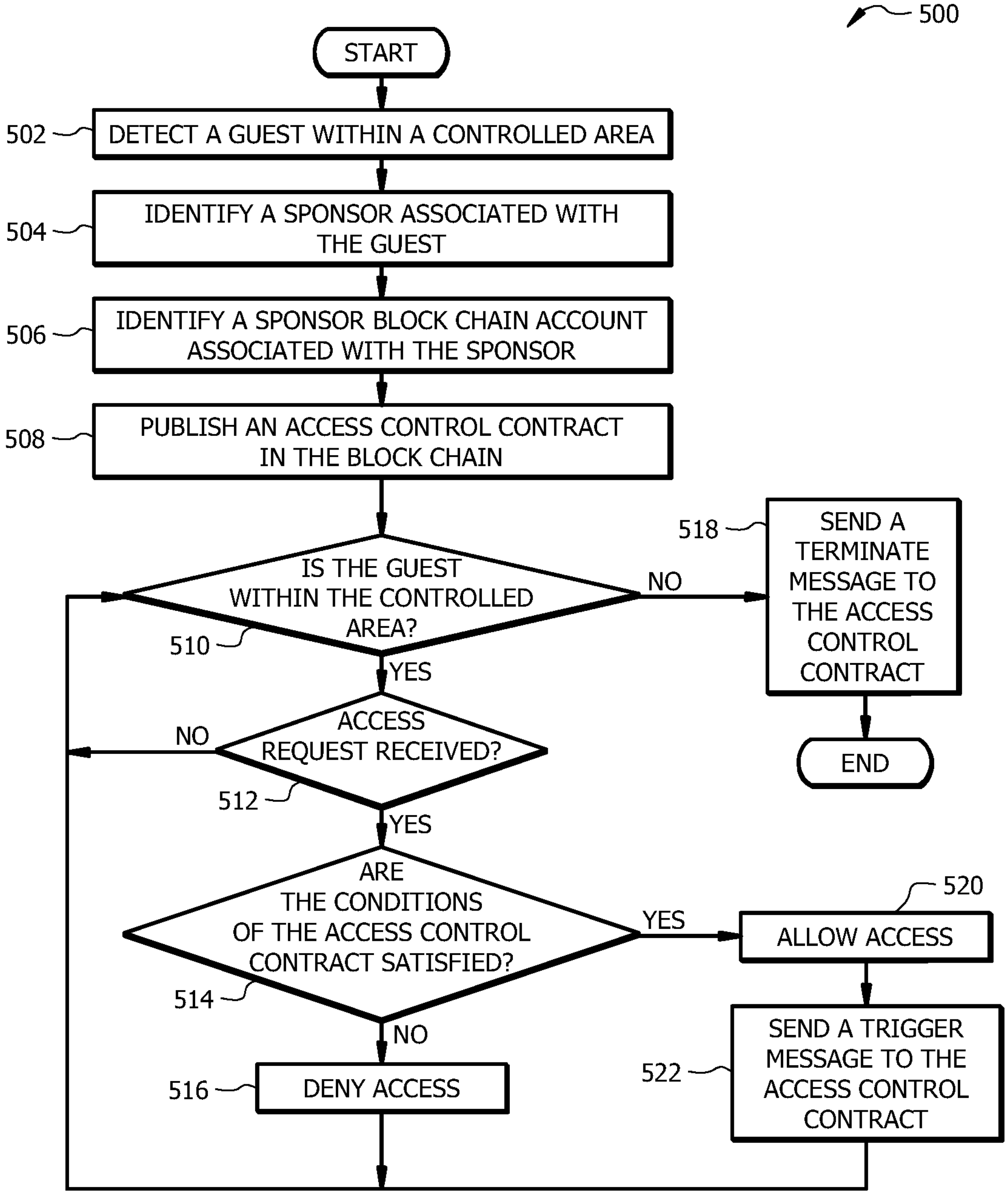
FIG. 5 is a flowchart of an embodiment of resource sharing method for an access control system.

FIGS. 4 and 5 combine to provide another non-limiting example of an environment and application where an access control system may be implemented. In this example, a guest is visiting a controlled area without their sponsor present. For instance, the guest may be teenager visiting an amusement park without their parents. The access control system is configured to monitor for access requests 219 for the guest to provide access to rooms, attractions, products, services, information, and/or resources within the controlled area. The access control system uses an access control contract to dynamically allow or deny access to shared resources within the controlled area. This allows the access control system to continuously monitor the guest's behavior to determine whether to allow access and usage of shared resources and allows the access control system to control how the guest is able to use the shared resources.

FIG. 4 is a schematic diagram of an embodiment of an access control system 400 employing resource sharing. The controlled area 402 is an area defined by physical and/or virtual boundaries and is similar to the controlled area 204 described in FIG. 2. The controlled area 402 comprises a controller 206 in signal communication with a plurality of IoT sensors 208. The controller 206 and the IoT sensors 208 in FIG. 4 are configured similar to controller 206 and IoT sensors 208 described in FIG. 2.

In this example, the controlled area 402 comprises one or more vendors 406. Vendors 406 are prepared to offer or sell good and/or services to guests within the controlled area 402. For example, a vendor 406 may sell food, drinks, merchandise, products, services, access to restricted access areas, information, or any other suitable type of product or service. In one embodiment, a vendor 406 may comprise a point-of-sale (POS) device configured to send access requests 219 to the controller 206 for purchases for the guest 202. For example, a vendor 406 may send an access request 219 to the controller 206 that identifies one or more products the guest 202 is requesting and a requested amount of credits 221. Credits 221 may be an actual currency or a pseudo-currency. The controller 206 is configured to reviewing the access request 219 to determine whether the request satisfies the conditions 114 specified by the access control contract 110. When the controller 206 determines that the request satisfies the conditions 114 of the access control contract 110, the controller 206 sends an approval message that allows the guest 202 to access or purchase the requested items. When the controller 206 determines that the request does not satisfy the conditions 114 of the access control contract 110, the controller 206 sends a denial message that prevents the guest 202 from accessing or purchasing the requested items. An example of the controller 206 implementing this process is described in FIG. 5.

In one embodiment, the controlled area 402 may comprise one or more restricted access areas 410. A restricted access area 410 may be an area that requires special permission and/or an additional cost to access. For example, a restricted access area 410 may be a VIP section within the controlled area 402. In one embodiment, a vendor 406 or an IoT sensor 208 may send an access request 219 for the guest 202 to the controller 206. The controller 206 is configured to review the access request 219 to determine whether the guest 202 is pre-approved to access the restricted area 410 based on the conditions 114 of the access control contract 110. An example of the controller 206 implementing this process is described in FIG. 5.

FIG. 5 is a flowchart of an embodiment of resource sharing method 500 for an access control system 400. Continuing with the previous example, the guest 202 is a child visiting an amusement park without their parent (i.e. their sponsor 203). The resource sharing method 500 may be implemented by the controller 206 to monitor for access requests 219 for the guest 202 to provide access to rooms, attractions, products, services, information, and/or resources within the controlled area 402.

At step 502, the controller 206 detects a guest 202 within the controlled area 402. The controller 206 may detect the guest 202 is within the controlled area 402 using a process similar to the process described in step 302 in FIG. 3. For example, the controller 206 may detect the guest 202 based on a user device 205 (e.g. a mobile phone) linked with the guest 202.

At step 504, the controller 206 identifies a sponsor 203 associated with the guest 202. In one embodiment, the guest 202 and one or more of their user devices 205 may be linked with a sponsor 203. For example, a parent may have previously registered their children and their user devices 205. In this example, the controller 206 is configured to use information about the detected guest 202 to look up and identify the sponsor 203 linked with the guest 202. In other embodiments, the controller 2036 may identify the sponsor 203 linked with the guest 202 using any other suitable technique.

At step 506, the controller 206 identifies a sponsor block chain account 209 associated with the sponsor 203. The controller 206 may identify a sponsor block chain account 209 associated with the sponsor 203 using a process similar to the process described in step 306 in FIG. 3.

At step 508, the controller 206 publishes an access control contract 110 in the block chain 100. The controller 206 may publish an access control contract 110 to the block chain 100 using a process similar to the process described in step 310 of FIG. 3. Referring to FIG. 4, the controller 206 may publish the access control contract 110 to block 102A in the block chain 100. The access control contract 110 comprises instructions 112 for publishing a transaction in the block chain 100 transferring credits 221 (e.g. currency or pseudo-currency) from the sponsor block chain account 209 to a vendor block chain account 223 and conditions 114 for when to execute the instructions 112. The credits 221 may be used to purchase good and/or services within the controlled area 402. In one embodiment, the conditions 114 may specify a credit allowance 117, a valid time period, approved product or service types, approved areas, or any other suitable conditions specified by the sponsor 203.

In one embodiment, the controller 206 periodically checks whether the guest 202 is still within the controlled area 402. This allows the controller 206 to manage resources for tracking and monitoring the guests 202. For example, the controller 206 may release and reallocate resources when the guest 202 leaves the controlled area 402. At step 510, the controller 206 determines whether the guest 202 is within the controlled area 402. The controller 206 may receive location information from one or more IoT sensors 208 that indicates that the guest 202 is still within the controlled area 402. The controller 206 proceeds to step 512 in response to determining that the guest 202 is within the controlled area 402. Otherwise, the controller 206 proceeds to step 518 in response to determining that the guest 202 is no longer within the controlled area 402.

At step 512, the controller 206 determines whether an access request 219 has been received. In one embodiment, access requests 219 may be generated and sent by vendors 406 or IoT sensors 208 in response to a guest 202 requesting access to a good, service, information, or a restricted access area. Examples of access requests 219 include, but are not limited to, requests for food, drinks, merchandise, products, services, restricted access areas, and information. In one embodiment, the access request 219 may be generated and sent by the guest's user device 205, for example via a mobile application.

In one embodiment, the access request 219 identifies a vendor (e.g. vendor block chain account 223 or a vendor identifier) and a quantity of credits 221 that are being requested by the guest 202 for making a purchase. In one embodiment, an access request 219 may identify a product type. For example, the access request 219 may identify drinks, food, alcohol, tobacco, services, or any other suitable product type. The product type information may be used by the controller 206 when determining whether the access control conditions 114 have been satisfied. Access requests 219 may be any suitable type of message as would be appreciated by one of ordinary skill in the art. The controller 206 proceeds to step 514 in response to determining that an access request 219 has been received. Otherwise, the controller 206 returns to step 510 in response to determining that an access request 219 has not been received.

At step 514, the controller 206 determines whether the conditions 114 of the access control contract 110 have been satisfied. The access control contract 110 may specify any combination of condition 114 that are to be satisfied before providing access for the guests 202. In one embodiment, the controller 206 determines whether the requested quantity of credits 221 is less than or equal to the credit allowance 117 specified by the conditions 114 of the access control contract 110. The controller 206 determines the access control contract conditions 114 are at least partially satisfied when the requested amount of credits 221 is less or equal to the credit allowance 117.

In one embodiment, the controller 206 confirms whether the guest 202 is within the controlled area 402. The controller 206 may receive location information from one or more IoT sensors 208 that indicate that the guest 202 is still within the controlled area 402. The controller 206 may determine the access control conditions 114 are at least partially satisfied when the guest 202 is within the controlled area 402.

In one embodiment, the controller 206 determines whether the current time is within a valid time period identified by the access control contract 110. In this example, the access control contract conditions 114 may also specify a time period or window when the guest 202 is allowed to make access requests 219. For instance, the guest 202 may only make access requests 219 within an eight hour time window. The conditions 114 may specify any suitable time window or period. In some examples, the conditions 114 may not specify a valid time period.

In one embodiment, when the access request 219 identifies a product type, the controller 206 determines whether the identified product type is an approved product type for the guest 202. For example, the controller 206 may determine whether the identified product type is on a list 119 of approved product types for the guest 202 and may determine the access control conditions 114 are at least partially satisfied when the product type is on the approved list 119 of product types. In this example, the sponsor 203 is able to prevent the guest 202 from accessing certain products like alcohol or tobacco by omitting these product types from the approved list 119 of product types. This allows the sponsor 203 to control which products the guest 202 has access to.

In one embodiment, when the access request 219 identifies a restricted access area, the controller 206 determines whether the identified area is an approved area for the guest 202. For example, the controller 206 may determine whether the identified area is on a list 119 of approved areas for the guest 202 and may determine that the access control conditions 114 are at least partially satisfied when the area is on the approved list 119 of areas.

The controller 206 proceeds to step 520 in response to determining that the conditions 114 of the access control contract 110 have been satisfied. Otherwise, the controller 206 proceeds to step 516 in response to determining that the conditions 114 of the access control contract have not been satisfied.

At step 520, the controller 206 allows access to the request in the access request 219. When the access control contract conditions 114 have been satisfied, the controller 206 determines that the access request 219 is for something that the sponsor 203 has pre-approved resources or access for the guest 202. Accordingly, the controller 206 allows the access request 219. For example, the controller 206 may send an approval message to the vendor 406 that indicates the guests 202 is approved for the requested purchase. The approval message may be any suitable type of message as would be appreciated by one of ordinary skill in the art. In one embodiment, the controller 206 may determine the guest 202 is requesting access to a restricted access area and may allow access for the guest 202 to the restricted access area.

At step 522, the controller 206 sends a trigger message 215 to the access control contract 110. The controller 206 may send a trigger message 215 to the access control contract 110 using a process similar to the process described in step 320 in FIG. 3. For example, referring to FIG. 4, the access control contract 110 may publish the transaction to block 102B in the block chain 100. As another example, when the access request 219 includes access to a restricted access area 410, the access control contract 110 may publish this transaction to block 102F in the block chain 100. This process allows the controller 206 to keep track of the access that was provided to the guest 202. After sending the trigger message 215, the controller 206 returns to step 510 to wait for additional access requests 219. In one embodiment, sending the trigger message 215 reduces the credit allowance 117 for the guest 202. In other words, the controller 206 may reduce the credit allowance 117 by sending the trigger message 215 to the access control contract 110 which allows the controller 206 to update the remaining amount of pre-approved credits 221 for the guest 202.

Returning to step 514, the controller 206 proceeds to step 516 in response to determining that the conditions 114 of the access control contract 110 have not been satisfied. At step 516, the controller 206 denies the access request 219 and returns to step 510 to check for additional access requests 219. When the access control contract conditions 114 have not been satisfied, the controller 206 determines that the access request 219 is for something that the sponsor 203 has not pre-approved resources or access for the guests 202. Accordingly, the controller 206 denies the access request 219. For example, the controller 206 may send a denial message to the vendor 406 that indicates the guests 202 is not been approved for the requested purchase. The controller 206 may send the denial message or a notification to the guest 202, sponsor, 203, and/or vendor 406 indicating the reasons for denying the access request 219. For example, the denial message may indicate that the access request 219 was for an unapproved product type. As another example, the controller 206 may determine the guest 202 the guest 202 is requesting access to a restricted access area and may deny the guest 202 from accessing the restricted access area. In this example, the denial message may indicate that the access request 219 was for an unapproved area.

In one embodiment, the controller 206 may determine that the guest 202 is accessing a user interface 227 (e.g. a kiosk or device) in a restricted access area and may modify the user interface 227 to restrict the information that is available and/or presented to the guest 202 in response to denying the access request 219.

Returning to step 510, the controller 206 proceeds to step 518 in response to determining that the guest 202 is no longer within the controlled area 402. At step 518, the controller 206 sends a terminate message 217 to the access control contract 110 and terminates method 500. The controller 206 may send a terminate message 217 to the access controller contract 110 using a process similar to the process described in step 322 in FIG. 3. This allows the controller 206 to release and reallocate resources that are used for tracking and monitoring the guest 202.

In one embodiment, the controller 206 may generate a summary 225 for the credits 221 that were used by the guest 202 and may send the generated summary 225 to the sponsor 203. For example, the controller 206 may generate a summary 225 for the credits 221 that were transferred from the sponsor block chain account 209 to vendor block chain accounts 223. In this example, the controller 206 provides information that allows the sponsor 203 to review the transactions that were made by the guest 202 during their visit to the controlled area 402. The summary 225 may be any suitable type of document and may be sent using any suitable form of communication. For example, the summary 225 may be text document that is sent to the sponsor 203 via email or an online document.

Figure 6:
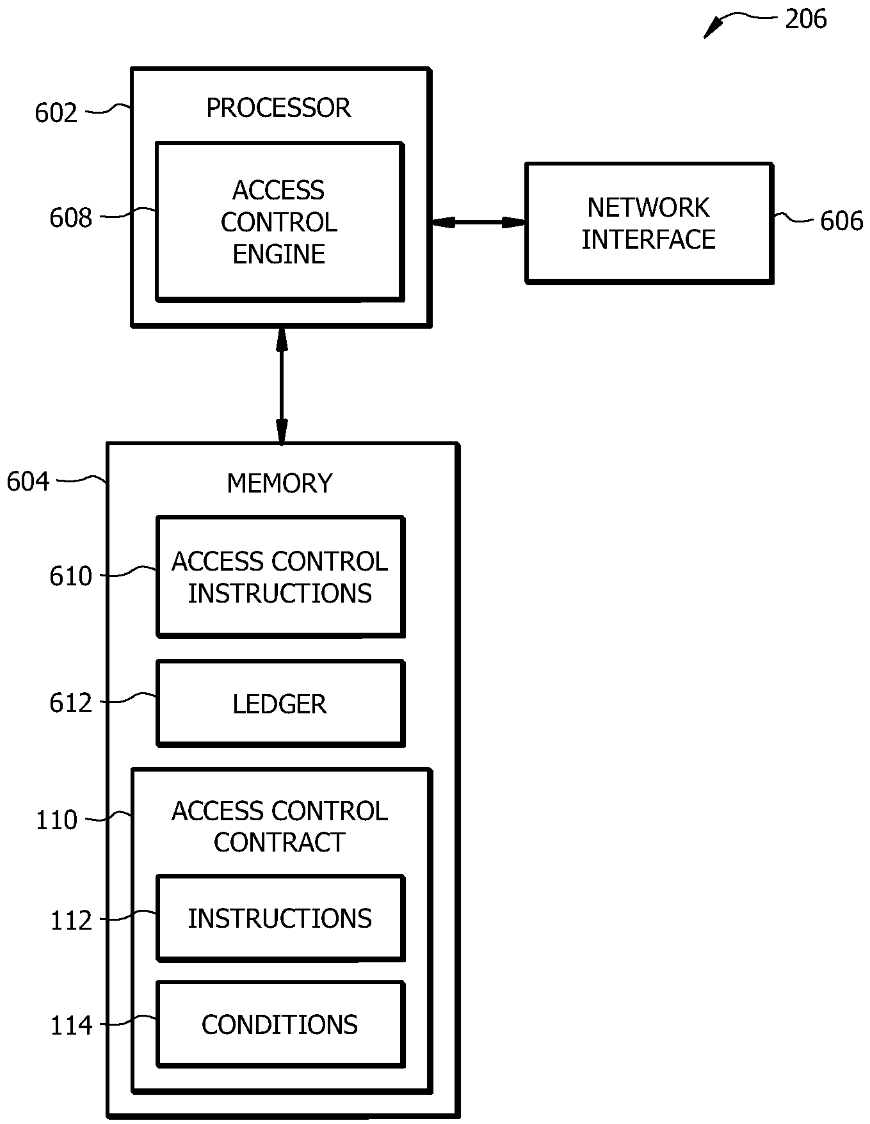
FIG. 6 is a schematic diagram of an embodiment of a controller for an access control system.

FIG. 6 is a schematic diagram of an embodiment of a controller 206 for an access control system 200. The controller 206 comprises a processor 602, a memory 604, and a network interface 606. The controller 206 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an access control engine 608. In an embodiment, the access control engine 608 is implemented using logic units, FPGAs, ASICs, DSPs, or any other suitable hardware.

In one embodiment, the access control engine 608 is configured to facilitate access control by monitoring the location of a guest 202 using the IoT sensors 208. Based on information received by the IoT sensors 208, the access control engine 608 determines whether conditions 114 of an access control contract 110 in a block chain 100 have been satisfied and, based on the determination, communicate with the access control contract 110 to provide access control for the guest 202 within the controlled area 204. Access control may include access to areas, information, and/or resources within the controlled area 204. Examples of the access control engine 308 in operation are described in FIGS. 3 and 5.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise ROM, RAM, ternary content-addressable memory (TCAM), dynamic random-access memory (DRAM), and static random-access memory (SRAM). The memory 604 is operable to store access control instructions 610, block chain ledgers 612, access control contracts 110, and/or any other data or instructions. The access control instructions 610 comprise any suitable set of instructions, logic, rules, or code operable to execute the access control engine 608. The access control contracts 110 are configured similar to the access control contracts 110 described in FIG. 1.

The block chain ledger 612 is configured to store a copy of one or more block chains 100. Each block chain 100 stored in the ledger 612 contain every block chain transaction executed by a network. When the controller 206 publishes an entry (e.g. a transaction 104 or access control contract 110) in its ledger 612, the block chain 100 for all of the other network nodes in the distributed network is also updated with the new entry. This allows data published in a block chain 100 to be available and accessible to every network node with a copy of the ledger 612. This accessibility allows the information in the block chain 100 to be verified and validated by any other network nodes in the network.

The network interface 606 is configured to enable wired and/or wireless communications. The network interface 606 is configured to communicate data through an access control system and/or any other system or domain. For example, the network interface 606 may be configured for communication with IoT devices 208, a modem, a switch, a router, a bridge, a server, or a client. The processor 602 is configured to send and receive data using the network interface 606. The network interface 606 may be configured to any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An access control system, comprising:

a plurality of Internet of Things (IoT) sensors within a controlled area, wherein each IoT sensor is configured to:

determine a current guest location based on a signal strength between an IoT sensor and a guest device; and determine a current sponsor location based on a signal strength between an IoT sensor and a sponsor device; and a controller in signal communication with the plurality of IoT sensors, comprising:

a memory operable to store a block chain ledger comprising a plurality of block chain transactions; and a network interface configured to receive data from the plurality of IoT sensors; and an access control engine operably coupled to the memory and the network interface, configured to:

detect a guest device for a guest within the controlled area;

link a guest block chain account with the guest;

identify a sponsor associated with the guest;

identify a sponsor block chain account linked with the sponsor;

publish an access control contract to the block chain, wherein the access control contract comprises:

executable instructions for publishing a transaction in the block chain transferring a validation token from the sponsor block chain account to the guest block chain account, wherein the validation token indicates the guest is authorized to access the controlled area; and conditions linked with the executable instructions, wherein:

the conditions identify a range threshold value indicating a maximum distance between a current guest location and a current sponsor location; and the instructions are executed when the conditions are satisfied;

periodically determine whether the conditions have been satisfied, wherein determining whether the conditions have been satisfied configures the access control engine to:

receive the current guest location from one or more IoT sensors;

receive the current sponsor location from one or more IoT sensors;

determine a location difference between the current guest location and the current sponsor location; and determine the conditions have been satisfied when the location difference is less than the range threshold value; and send a trigger message to the access control contract in response to determining the conditions have been satisfied, wherein sending the trigger message triggers the access control contract to execute the instructions that transfer a validation token from the sponsor block chain account to the guest block chain account.

2. The system of claim 1, wherein:

the conditions identify a time period; and wherein determining whether the conditions have been satisfied configures the access control engine to:

determine a current time; and determine the conditions are satisfied when the location difference is less than the range threshold value when the current time is within the time period.

3. The system of claim 1, wherein the access control engine is further configured to:

determine the guest is in a restricted access area based on the current guest location; and reduce the range threshold value used for determining whether the conditions have been satisfied in response to determining that the guest is in a restricted area.

4. The system of claim 1, wherein:

the access control contract comprises:

termination instructions to suspend transferring credits from the sponsor block chain account to the guest block chain account; and termination conditions linked with the termination instructions wherein the termination instructions are executed when the termination conditions are satisfied; and the access control engine is further configured to:

determine the guest has left the controlled area; and send a terminate message to the access control contract in response to determining the guest has left the controlled area, wherein sending the terminate message triggers the access control contract to execute the terminate instructions to suspend transferring credits from the sponsor block chain account to the guest block chain account.

5. The system of claim 1, wherein periodically determining whether the conditions have been satisfied occurs at predetermined time intervals.

6. The system of claim 1, wherein the plurality of IoT sensors are configured to use near-field communication (NFC) to determine the signal strength between an IoT sensor and the guest device.

7. The system of claim 1, wherein:

the validation token is invalid after a predetermined amount of time; and the guest loses authorization to access the controlled area when there are no valid validation tokens.

8. An access control method, comprising:

detecting, by an access control engine implemented by a processor, a guest device for a guest within a controlled area;

linking, by the access control engine, a guest block chain account with the guest;

identifying, by the access control engine, a sponsor associated with the guest;

identifying, by the access control engine, a sponsor block chain account linked with the sponsor;

publishing, by the access control engine, an access control contract to a block chain, wherein the access control contract comprises:

executable instructions for publishing a transaction in the block chain transferring a validation token from the sponsor block chain account to the guest block chain account, wherein the validation token indicates the guest is authorized to access the controlled area; and conditions linked with the executable instructions, wherein:

the conditions identify a range threshold value indicating a maximum distance between a current guest location and a current sponsor location; and the instructions are executed when the conditions are satisfied;

periodically determining, by the access control engine, whether the conditions have been satisfied, comprising:

receiving the current guest location from one or more Internet of Things (IoT) sensors;

receiving the current sponsor location from one or more IoT sensors;

determining a location difference between the current guest location and the current sponsor location; and determining the conditions have been satisfied when the location difference is less than the range threshold value; and sending, by the access control engine, a trigger message to the access control contract in response to determinining the conditions have been satisfied, wherein sending the trigger message triggers the access control contract to execute the instructions for transferring a validation token from the sponsor block chain account to the guest block chain account.

9. The method of claim 8, wherein:

the conditions identify a time period; and determining whether the conditions have been satisfied further comprises:

determining a current time; and determining the conditions are satisfied when the location difference is less than the range threshold value when the current time is within the time period.

10. The method of claim 8, further comprising:

determining, by the access control engine, the guest is in a restricted access area based on the current guest location; and reducing, by the access control engine, the range threshold value used for determining whether the conditions have been satisfied in response to determining that the guest is in a restricted area.

11. The method of claim 8, wherein:

the access control contract comprises:

termination instructions to suspend transferring credits from the sponsor block chain account to the guest block chain account; and termination conditions linked with the termination instructions wherein the termination instructions are executed when the termination conditions are satisfied; and further comprising:

determining, by the access control engine, the guest has left the controlled area; and sending, by the access control engine, a terminate message to the access control contract in response to determining the guest has left the controlled area, wherein sending the terminate message triggers the access control contract to execute the terminate instructions to suspend transferring credits from the sponsor block chain account to the guest block chain account.

12. The method of claim 8, wherein periodically determining whether the conditions have been satisfied occurs at predetermined time intervals.

13. The method of claim 8, wherein determining the current guest location comprises using near-field communication (NFC) to determine the signal strength between an IoT sensor and the guest device.

14. The method of claim 8, wherein:

the validation token is invalid after a predetermined amount of time; and the guest loses authorization to access the controlled area when there are no valid validation tokens.

15. An access control device, comprising:

a memory operable to store a block chain ledger comprising a plurality of block chain transactions; and a network interface configured to receive data from a plurality of Internet of Things (IoT) sensors; and an access control engine operably coupled to the memory and the network interface, configured to:

detect a guest device for a guest within a controlled area;

link a guest block chain account with the guest;

identify a sponsor associated with the guest;

identify a sponsor block chain account linked with the sponsor;

publish an access control contract to the block chain, wherein the access control contract comprises:

executable instructions for publishing a transaction in the block chain transferring a validation token from the sponsor block chain account to the guest block chain account, wherein the validation token indicates the guest is authorized to access the controlled area; and conditions linked with the executable instructions, wherein:

the conditions identify a range threshold value indicating a maximum distance between a current guest location and a current sponsor location; and the instructions are executed when the conditions are satisfied;

periodically determine whether the conditions have been satisfied, wherein determining whether the conditions have been satisfied configures the access control engine to:

receive the current guest location from one or more IoT sensors;

receive the current sponsor location from one or more IoT sensors;

determine a location difference between the current guest location and the current sponsor location; and determine the conditions have been satisfied when the location difference is less than the range threshold value; and send a trigger message to the access control contract in response to determining the conditions have been satisfied, wherein sending the trigger message triggers the access control contract to execute the instructions that transfer a validation token from the sponsor block chain account to the guest block chain account.

16. The device of claim 15, wherein:

the conditions identify a time period; and wherein determining whether the conditions have been satisfied configures the access control engine to:

determine a current time; and determine the conditions are satisfied when the location difference is less than the range threshold value when the current time is within the time period.

17. The device of claim 15, wherein the access control engine is further configured to:

determine the guest is in a restricted access area based on the current guest location; and reduce the range threshold value used for determining whether the conditions have been satisfied in response to determining that the guest is in a restricted area.

18. The device of claim 15, wherein:

the access control contract comprises:

termination instructions to suspend transferring credits from the sponsor block chain account to the guest block chain account; and termination conditions linked with the termination instructions wherein the termination instructions are executed when the termination conditions are satisfied; and the access control engine is further configured to:

determine the guest has left the controlled area; and send a terminate message to the access control contract in response to determining the guest has left the controlled area, wherein sending the terminate message triggers the access control contract to execute the terminate instructions to suspend transferring credits from the sponsor block chain account to the guest block chain account.

19. The device of claim 15, wherein periodically determining whether the conditions have been satisfied occurs at predetermined time intervals.

20. The device of claim 15, wherein:

the validation token is invalid after a predetermined amount of time; and the guest loses authorization to access the controlled area when there are no valid validation tokens.

* * * * *